April 16, 1940.  E. M. FERGUSON ET AL  2,197,522

VARIABLE SPEED DRIVING MECHANISM

Filed June 15, 1936  2 Sheets-Sheet 1

Inventor
Edwin M. Ferguson
Albert W. Barton

By Howard L. Fischer

Attorney

April 16, 1940.  E. M. FERGUSON ET AL  2,197,522
VARIABLE SPEED DRIVING MECHANISM
Filed June 15, 1936  2 Sheets-Sheet 2

Inventor
Edwin M. Ferguson
Albert W. Barton
By
Attorney

Patented Apr. 16, 1940

2,197,522

UNITED STATES PATENT OFFICE 2,197,522

VARIABLE SPEED DRIVING MECHANISM

Edwin M. Ferguson and Albert W. Barton, Minneapolis, Minn., assignors to Edwin M. Ferguson and Edmund Dulac, Minneapolis, Minn.

Application June 15, 1936, Serial No. 85,274

14 Claims. (Cl. 192—75)

Our invention relates to an improvement in variable speed driving mechanism of a type capable of driving various machines at a speed which may be regulated as desired.

While variable speed driving mechanisms have been used previously, such former devices have certain disadvantages in operation. For example, it has been found that the size and capacity of former devices was limited to a narrow scope. Obviously, the outside diameter of such power transmitting devices is definitely limited. While friction surfaces could be increased by increasing the diameter of the driving device, the space available to receive the installation and surrounding interferences ordinarily encountered operated as important limitations. Furthermore, such an increase in diameter necessitated a great increase in weight at a point far from the shaft axis, giving rise to centrifugal forces of considerable magnitude and placing a great strain upon the supporting shaft, particularly during swift acceleration and deceleration.

It should also be noted that with each increase in diameter, comes an increase in slipping velocity. Accordingly with large diameters the friction surfaces are extremely apt to burn out with excessive heat caused by the high slipping velocity. The diameter is definitely limited due to this fact.

While the friction surface could be increased by widening the pulley, previous constructions supported the outer driving surface from a point considerably offset from the center thereof, due to the necessity of having the friction applied centrally of the driving surface. The width of the friction surfaces in such pulleys or driving mechanisms was in this way definitely limited in order to limit the amount of overhang.

In order to avoid these various former difficulties, and to make the power transmitting device suitable for transmitting greater loads than was formerly possible with any practical construction, we have designed a driving device in which the outer driving pulley or drive member is in two parts, having the friction clutch mechanism enclosed within these two parts. In this manner, the strain upon the outer drive member may be carried centrally, and a plurality of oppositely disposed friction clutch members may be mounted within the casing on each side of the center thereof. The strain is then centrally distributed, and the friction engagement is also centralized. The friction surface may then be increased without increasing the diameter of the drive mechanism, and without offsetting the friction engagement from the center of the mechanism, and without providing overhang.

In carrying out our invention we have provided novel features which further increase the desirability of the device. It is an object of our invention to provide a balancing arrangement by means of which the friction of each of the elements of the friction clutch is equalized. This means operates to transmit pressure from the expanding cams to each of the friction surfaces of all of the friction shoes, providing an equal pressure on each of the friction shoes.

It is a purpose of our invention to combine the expanding cam control with a centrifugal governor construction in such a manner that the friction shoes may be either controlled manually, or by the centrifugal governor, and to provide a balancing control which will regulate the effective pressure of the friction shoes on a friction surface.

It is a further object of our invention to provide a friction drive mechanism which is formed in two parts to entirely enclose the friction driving elements, and to design said mechanism in such a manner that the friction elements, or shoes, may be replaced without disassembling the pulley. The construction is such that the wearing parts may be replaced with little difficulty.

It is a further feature of our invention to provide air directing fins adjacent to the friction surface of the pulley, to dissipate the heat generated by the slipping of the friction shoes. These fins direct air through the pulley from one side to another, preventing overheating either of the pulley itself, or of the driving belts.

It is an added feature of our invention to provide a plurality of friction blocks, operated by an equalizing lever from a common bell crank. A series of such units are provided arranged circumferentially about the pulley, and a means is provided between the equalizing lever and the bell crank for adjustment of each unit. The end of the bell crank actuating the equalizing lever is hollowed out to provide a constantly central contact against the adjusting means on the equalizing lever, regardless of the angle between these two members.

It is a further object of our invention to provide a split or double follower ring within the pulley by means of which motion from an external operating device may be transmitted through the pulley casing to the bell crank levers for actuating the friction shoes within the casing. A ball bearing or roller bearing between these two parts of the follower ring permits one part of the ring to travel at the pulley speed, and the other part of the ring to travel at clutch speed, to avoid friction and wearing which would otherwise result.

It is a feature to provide a variable speed drive mechanism of a sectional nature, whereby the sections may be connected together to make up the unitary variable speed driving mechanism. Single units may be employed, or a series may be associated together to provide the variable speed means desired.

Each variable speed drive unit includes drive pulley means having a belt receiving surface on the outside which may be of any desired nature, and one of the preferred forms of which is a series of V-grooves formed therein which are adapted to receive the cross-sectional V-shaped driving belt means. The outer pulley portion of the variable speed driving mechanism is divided centrally into two sections, each section fitting over a series of clutch shoes and providing a simple assembly construction, as well as permitting the inner parts of the variable speed drive to be accessible by separating the sections of the pulley and removing the same.

A feature of the variable speed drive resides in spacing the drum portions which are adapted to be engaged by the friction shoes from the outer rim portion of the pulley and in providing a series of heat deflecting vanes or fins about the drum portion as well as forming V-grooves for the belts in the outer surface of the pulley which are adapted to dissipate the heat generated by the friction shoes on the drum. This construction prevents the pulley means of the variable speed drive from heating to an undesirable temperature by dissipating the heat rapidly away from the inner drum of the mechanism. The spokes of the pulleys are provided with blades for further circulating the air about the drum to assist in cooling the same.

An important feature of the variable speed driving mechanism resides in the proper balancing of the arms which support the clutch shoes. This may be accomplished in one form by providing a hollow end on the arm which may receive weight means, or the arm may be formed with the proper proportioned weight end, permitting the shoe supporting arms to be properly balanced. It is important that these shoe supporting arms be balanced so that the centrifugal force will not cause the shoes to continue to engage the drum of the pulley when the control cams which operate the arms are moved into releasing position as well as operating position, otherwise complete control of the friction shoes is not accomplished in releasing and applying the same. It is extremely important in devices of this character that a variable speed driving mechanism is provided which will not grab or jerk the driving shaft. This is particularly true where our variable speed driving mechanism is used on paper winding machines where it is important that the paper be wound with a hard core under uniform tension of the driving mechanism. This is readily accomplished by this variable speed driving mechanism owing to the fact that the control of the same is so accurate that the desired tension may be directed onto the driven shaft under variable speeds without the slightest jerk. Thus it will be apparent that an accurate balance is accomplished in the construction and operation of this variable speed driving mechanism.

A further feature of this variable speed driving mechanism resides in the construction of the same which provides a means of obtaining a variable speed from a source of positive power, such as a motor or other means of generating a driving power and wherein the variable driving mechanism may be operated from zero to the maximum speed for which the mechanism is designed in relation to the source of power, which is smoothly accomplished without jerking or grabbing. Thus this variable speed driving mechanism provides a means of varying the driving speed from the source of power to the mechanism to be driven which is extremely desirable, being easier on the driving means, as well as on the driven means.

These and other objects and novel features of our invention will be more clearly and fully set forth in the following specification and claims.

In the drawings forming a part of our specification:

Figures 4, 6, 7:
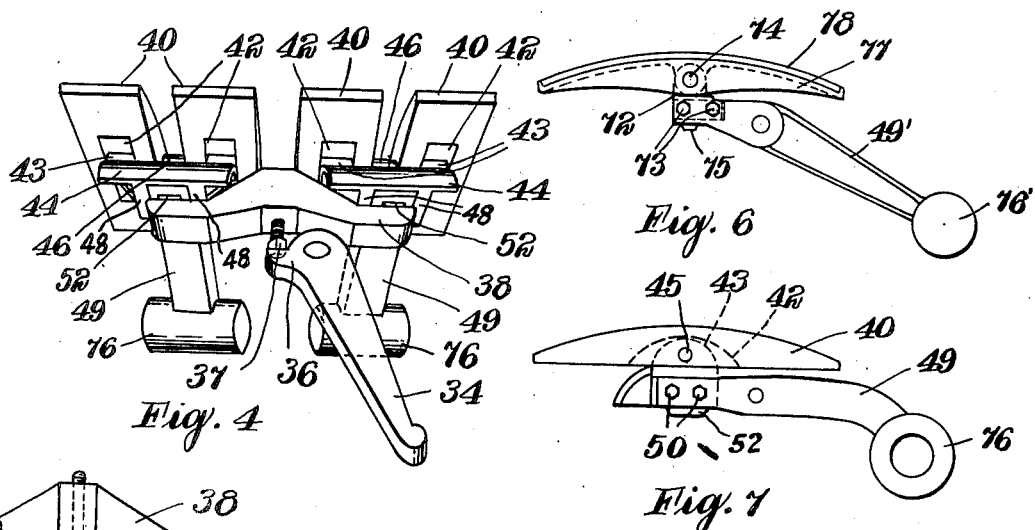
Figure 4 is a perspective view of a set of four friction shoes, governor weights, equalizer lever, and bell crank for operating the shoes, removed from the pulley to show the relationship thereof.

Figure 6 discloses a front view of a friction shoe and the manner in which the governor weight is attached thereto where but two coaxial sets of friction shoes are employed.

Figure 7 illustrates a front view of a friction shoe, a cross saddle for connecting a plurality of shoes, and for connecting the shoes to the governor weights.

Figure 8:
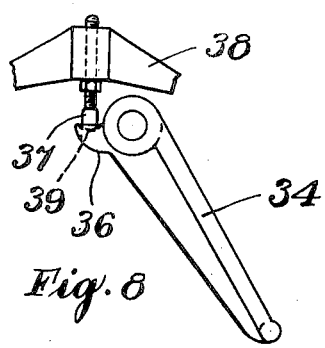

Figure 8 is a detail view of the equalizer lever and bell crank operating means therefor.

Our pulley A is provided with an outer belt engaging surface 10, which may be grooved, as shown at 11, to accommodate V-belts, or may be crown faced for engagement with flat belts. The pulley A may also be sprocket or gear driven. The pulley is driven in this way by a suitable power source. The pulley A is formed with a split outer casing formed in two parts 12 and 13, secured together by bolts 14, preferably at the center of the pulley engaging surface 10, to equalize the strain of the belt upon the two parts 12 and 13.

The parts 12 and 13 are provided with a cylindrical portion 15 extending from the adjoining surface 16 to a point substantially spaced from the center line of the pulley. Inner friction surfaces 17 are formed on the cylindrical portions 15. These cylindrical surfaces are connected by radially extending spokes 18 to hub portions 19 and 20, respectively. Anti-friction bearings 22 and 23 are provided between the hubs 19 and 20 and the central driven shaft 24 upon which the pulley A is mounted, so that the portions 12 and 13 of the casing are freely rotatable upon the shaft 24. The bearings 22 and 23 are held in position by nuts 25 and 26 on sleeves 27 and 28, respectively, each of which rotate with the shaft 24. Cover plates 29 and 30 secured to the hubs 19 and 20 enclose the bearings.

Between the cylindrical portions 15 of the parts 12 and 13 and the belt engaging surface 10, we provide radially extending fins 32, some of which connect these two parts, and others of which extend a portion of the distance between the parts. These fins 32 are angularly arranged to draw the air through the pulley, and thus to keep the cylindrical surface cooler at all times.

Centrally between the parts 12 and 13, we provide a central spider 33, keyed to the shaft 24. This spider 33 provides a support for a series of bell cranks 34, pivotally mounted at a point slightly offset from the center of the spider and of the pulley A. Each bell crank 34 is provided with a short arm 36 for engagement with an adjustment bolt 37 of an equalizing yoke or lever 38. As shown in Figure 8, the short arm 36 of each bell crank 34 is hollowed or countersunk at 39, so that this arm 36 will bear centrally against the bolt 37 regardless of the angular position of the crank 34.

The yokes 38 extend freely through holes in the spider 33 and are supported by weight arms in a manner which will be described.

Figure 1:
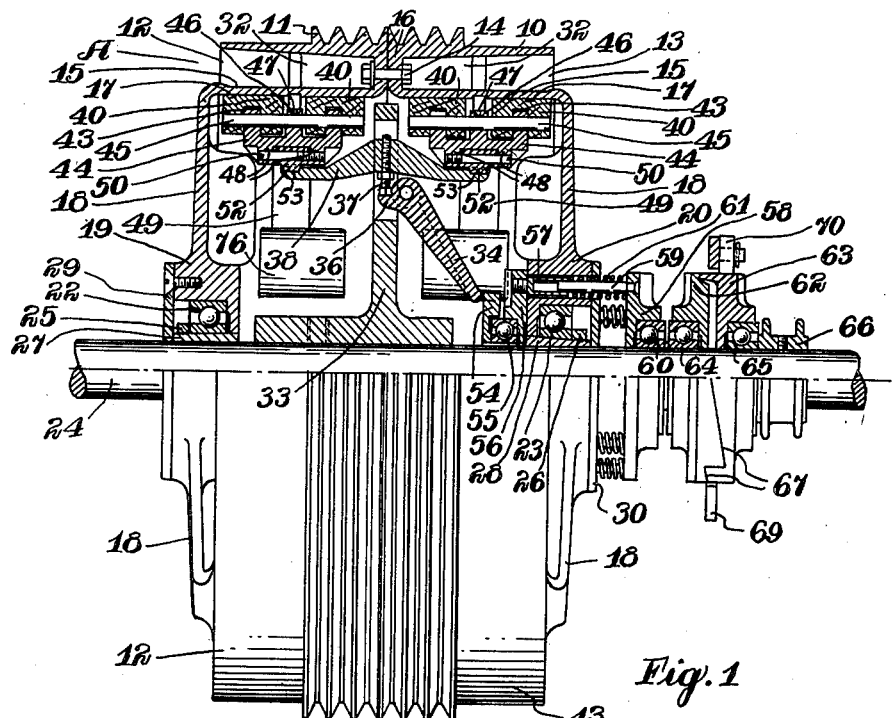
Figure 1 is a side elevation view, partially in cross-section, showing our pulley and clutch operating means.
Figure 2:
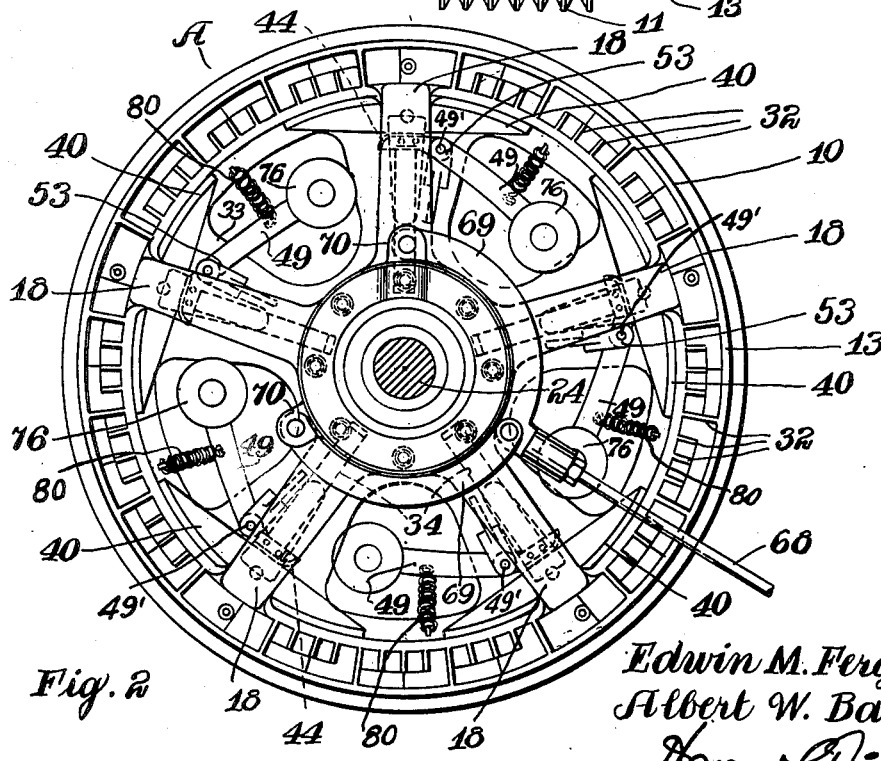
Figure 2 is a front elevation view of the pulley illustrated in Figure 1.

In the construction shown in Figures 1 through 4 of the drawings, each of the equalizer yokes 38 support four coaxial rows of friction shoes. The friction shoes may be of various types, and may either be formed of a solid block of wood or the like, or may have a base of metal to which friction material is secured, as will be later described more in detail. Figure 1 illustrates friction shoes 40 formed of a solid block of wood. The shoes 40 are centrally recessed at 42 to accommodate ears 43 of connecting saddles 44. Rods or pins 45 extend through a pair of shoes 40 centrally, through the ears 43, and through a central ear 46 on the saddle 44. Set screws 47 hold the rods 45 in position, pivotally connecting the shoes 40 to the saddle 44.

Each of the saddles 44 is formed with a pair of flanges 48 extending longitudinally on the side of the saddle opposite the ears 43 and 46. Governor weight arms 49 having weights 76 at one end thereof are secured by saddle bolts 50 rigidly to the saddles 44 between the flanges 48, the bolts 50 extending through the flanges 48 and through the arm 49. Each governor arm 49 is provided with a central boss 52 engageable in a slot 53 in one of the equalizer yokes or levers 38. The yokes 38 are thus supported between the arms 49 and the bell cranks 34, and are held by the bosses 52 and bolt 37 from angular or axial displacement. Each governor arm 49 is pivoted at 49'' between a bracket 53' on the spider 33, and the body of the spider itself. The weights 76 may be centrally drilled to equalize the weight thereof, or the central openings may be filled to provide more weight if heavy shoes 40 are used.

Each bell crank 34 is operated by a follower ring or disc 54, axially movable along the shaft 24, and mounted upon an anti-friction bearing 55. Axial movement of this disc or ring 54 moves all of the bell cranks 34 in unison. Movement of the ring 54 is controlled by movement of the complementary ring or driving disc 56, also mounted on the bearing 55, but upon the side thereof opposite that to which the ring 54 is attached, so that relative rotation may take place freely between these rings 54 and 56. Hollow studs 57 are secured to the ring 56 parallel the axis thereof, and project into openings in the hub 20. An equalizing disc 58, slidably mounted upon the shaft 24 externally of the pulley hub 20 but adjacent the same, supports pins 59 which extend through the openings in the hub 20 and into the hollow studs 57. Springs 61 interposed between the equalizing disc 58 and the ends of the hollow studs 57 transmit movement through this resilient connection to the driving disc 56, which in turn acts through the bearing 55 to move the follower ring 54.

The equalizing ring 58 is mounted upon a bearing 60 on the shaft 24, and is in turn moved axially by a control cam formed in two parts, 62 and 63, which parts are mounted upon anti-friction bearings 64 and 65, respectively. A set collar 66, mounted on the shaft 24 adjacent the part 63 of the cam, provides a shoulder from which the movement takes place. The parts 62 and 63 of the cam are provided with inclined surfaces 67, so that relative rotary movement between the parts 62 and 63 act to move the parts 62 and 63 away from, or toward, one another. As the parts 62 and 63 are rotated by means of a control rod 68 connected to spanners 69 connected to ears 70 on the parts 62 and 63, and the parts 62 and 63 are moved apart, movement is transmitted through the equalizer disc or ring 58, through the pins 59 and studs 57 and the springs 61, through the driving disc 56 and the follower ring 54, to the bell cranks 34.

The manner in which four or more coaxial rings of friction shoes are supported is best illustrated in Figure 4. In this view, a single set of shoes 40, saddles 44, equalizing yoke 38, and bell crank 34 are shown. The spider 33 is omitted in this figure, but acts to support the various elements shown, the equalizer yokes 38 extending through openings in the spider, and the bell cranks 34 and governor weight arms 49 are pivoted thereto.

Figures 3, 5:
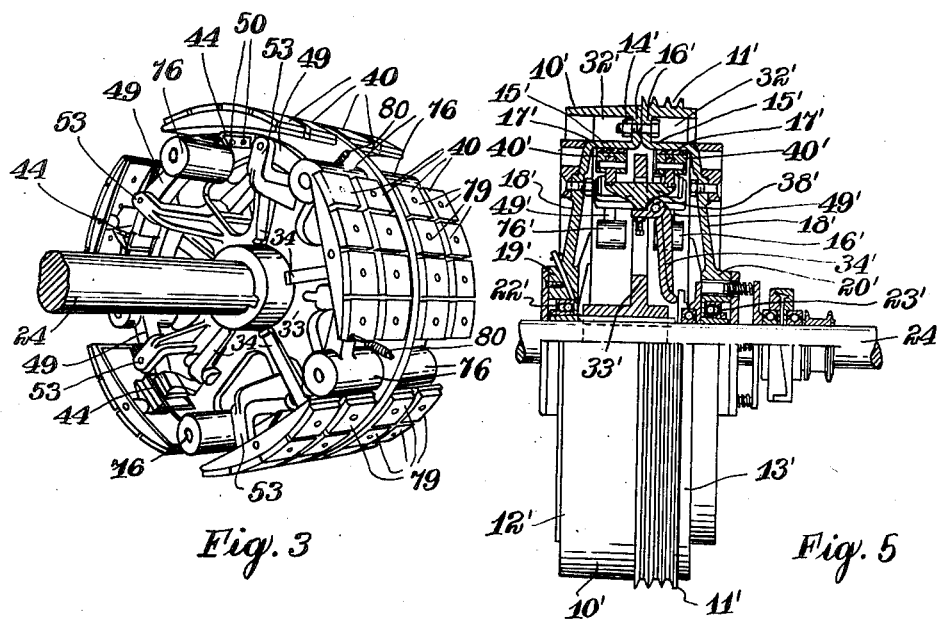
Figure 3 is a perspective view of the clutch mechanism removed from the pulley casing, and disclosing the friction shoes and the operating mechanism therefor.
Figure 5 is a side elevation view, partially in cross-section, of a slightly different form of pulley in which two coaxial sets of friction shoes are employed in place of four as in the modification shown in Figures 1 through 4.

Figure 5 illustrates a construction in which but two coaxial rows of friction shoes 40' are provided. This construction is similar in virtually every way to the construction of Figure 1, with the exception that the friction surface 17' of each part 12' and 13' of the pulley A' is narrower than that of the described construction, and but one row of friction shoes 40' is provided on each side of the spider 33'. The provision of but a single ring of shoes 40' on either side of the spider 33' eliminates the necessity of any saddle such as 44, and the shoes 40' are operated in the manner disclosed in Figure 6 of the drawings. In this construction, the governor arm 49' is bolted to a block lug 72 by saddle bolts 73. The block lug is pivotally connected to the shoe 40' by a block pin 74, or shaft. A boss 75, similar to the boss 52, is engageable with the equalizer yoke 38'.

In operation, rotation of the belt engaging surface 10 acts to rotate the casing 12, 13. The friction shoes 40 are normally spaced from the surface 17 by springs 80 connecting the arms 49 or 49' to the spider 33 or 33', but when the cam operating control rod 68 is actuated, the shoes 40 engage the friction surface 17 of the portions 12 and 13 of the pulley A. As the speed of the shaft 24 increases, the weights 76 on the governor arms 49 are thrown outwardly by centrifugal force, tending to decrease the pressure of the friction shoes upon the friction surface 17 of the parts 12 and 13 of the freely rotating outer casing of the pulley, to slow the shaft 24 down, somewhat by permitting the shoes 40 to slip more on the friction surface 17.

Manual control of the friction is obtained through operation of the control rod 68 which spreads the parts 62 and 63 of the cam apart, and pivots the bell cranks 34 inwardly, increasing the pressure upon the equalizing yokes 38, and urging the friction shoes against their friction surfaces 17. Virtually any amount of slippage desired can be obtained at any setting of the manual control 68, the governor acting to maintain the selected speed and pressure, by permitting the shoes 40 to slip more when the shaft 24 rotates faster than desired, and to engage more tightly when the shaft 24 rotates slower than desired.

In place of the friction shoes described, it is possible to provide hollow metal shoes as shown in Figure 6. These shoes 77 are provided with a replaceable friction surface 78. This surface may also be in the form of a series of smaller blocks 79, as shown in Figure 3 of the drawings.

It may be seen that there is a substantial circumferential distance between the various friction shoes. This distance, is equal to, or greater than, the width of the spokes 18. Accordingly, the friction shoes 40 or 40' may be removed and replaced by merely removing the saddle bolts 50 or 73, and removing the friction shoes between the spokes 18 from either side of the pulley. In this manner, the friction shoes may be replaced at any time without taking the pulley apart.

We have described the principles of operation of our variable speed drive mechanism, and while we have endeavored to set forth the best embodiment thereof, we desire to have it understood that this is only illustrative of a means of carrying out our invention, and that obvious changes may be made within the scope of the following claims without departing from the spirit of our invention.

We claim:

1. A variable speed drive mechanism including a drive housing, a shaft upon which said housing is freely mounted, friction shoes within said housing engageable with the housing, means on said shaft supporting said friction shoes rotatable with said shaft, said friction shoes arranged in a plurality of spaced coaxial rows within said housing and equalizing means engaging one shoe of each row to apply the engaged shoes with equal pressure regardless of unequal wear.

2. A variable speed mechanism including a split pulley, means for connecting the split parts of said pulley together, a friction surface within said pulley, a shaft upon which said pulley is freely mounted, a supporting means rotatable with said shaft within said pulley, friction shoes pivotally mounted on said supporting means engageable with said friction surface, governor means connected to said shoes to control the same, and adjusting means extending through one of said parts of said pulley for controlling the pressure with which said shoes engage said friction surface.

3. A variable speed drive mechanism including a split pulley having spaced bearings, a shaft freely rotatable in said bearings, a supporting means secured to said shaft intermediate said bearings within said pulley, friction shoes mounted on opposite sides thereof said supporting means engageable with said pulley, means extending through said supporting means for applying said shoes, and governor means cooperable with said last named means for regulating the pressure with which said shoes engage said pulley.

4. A variable speed mechanism including a split casing having spaced bearings, a shaft freely rotatable within said bearings, a supporting means intermediate said bearings rotatable with said shaft, a series of equalizer yokes, a plurality of friction shoes supported by said yokes and engageable with said split casing, and a series of means pivotally supported angularly spaced about said shaft and rotatable with said shaft for operatively engaging said yokes centrally to urge said friction shoes toward said casing.

5. A variable speed mechanism including a split casing having a pair of spaced bearings, a shaft freely rotatable in said bearings, a supporting means mounted intermediate said bearings rotatable with said shaft, a series of operating levers angularly spaced about said shaft pivotally supported by said supporing means, equalizer yokes centrally engaged by said operating levers, and oppositely disposed friction shoes supported by said equalizer yokes and movable toward said casing by said operating levers.

6. A variable speed mechanism including a split casing having a pair of spaced bearings, a shaft freely rotatable in said bearings, a supporting means mounted intermediate said bearings upon said shaft for rotation with said shaft, a series of operating levers pivoted to said supporting means, angularly spaced about said shaft, equalizing yokes centrally engaged by said operating levers, a series of co-axial friction surfaces within said casing, on either side of said supporting means, and friction shoes supported on oppositely disposed sides of the center of said yoke engageable with said friction surfaces.

7. A variable speed mechanism including a split pulley having bearing means, a shaft freely rotatable within said bearing means, a plurality of friction surfaces within said pulley, a series of coaxial friction shoes within said pulley engageable with said friction surfaces, means rotatable with said shaft for urging said shoes radially against said friction surfaces with equal pressure, and means extending through one side of said split pulley for operating said urging means.

8. A variable speed mechanism including a split casing having bearing means, a shaft freely rotatable within said bearing means, a series of coaxial rows of bearing surfaces within said casing, a series of coaxial bearing shoes engageable with said bearing surfaces, supported on said shaft, and rotatable therewith, equalizer means extending substantially parallel with said shaft for supporting a bearing shoe of each of said coaxial rows, and means supported by said supporting means on said shaft for actuating said equalizer means.

9. A sectional self-contained unitary variable speed driving mechanism including friction clutch shoe means, means for balancing said clutch shoe means against centrifugal force, means for operating said friction shoe means into and out of operating position, friction drum portions formed on each section, pulley portions connected with said drum portions and spaced therefrom, cooling fins extending from said drums and spaced from said pulley portions, and a series of annular belt grooves formed in said pulley portions having heat dissipating fin portions between each groove, whereby said variable speed driving mechanism is self-cooling under varying driving speeds.

10. A variable speed drive mechanism including a split pulley having spaced bearings, a shaft freely rotatable within said bearings, a supporting means mounted for rotation within said pulley between said bearings, friction shoes engageable with said pulley mounted upon said supporting means, a governor controlling movement of said shoes, separate means for actuating said friction shoes, follower ring means engageable with said actuating means to actuate the same, and means extending through one side of said pulley and engageable with said follower ring to operate said friction shoes externally of said pulley.

11. In a variable speed device, a pulley casing, a shaft freely rotatable therein, friction shoes engageable with said pulley casing, a supporting means mounted upon said shaft for rotation therewith, bell crank operating means on said supporting means, means interposed between said friction shoes and said bell crank operating means for transmitting motion of said bell crank operating means to said shoes, and a hollowed recess in said bell crank in which said interposed means is engaged providing a single point of contact between said bell crank and said interposed means regardless of the position of said bell crank.

12. A variable speed drive mechanism including a pulley having a central bearing, a shaft freely rotatable in said bearing, a supporting means secured to said shaft within said pulley, friction shoes mounted on opposite sides thereof, said supporting means engageable with said pulley, means extending through said supporting means for applying said shoes, and governor means cooperable with said last named means for regulating the pressure with which said shoes engage said pulley.

13. A variable speed mechanism including a casing having a central bearing, a shaft freely rotatable within said bearing, a supporting means rotatable with said shaft within said casing, a series of equalizer yokes, a plurality of friction shoes supported by said yokes and engageable with said casing, and a series of means pivotally supported angularly spaced about said shaft and rotatable with said shaft for operatively engaging said yokes centrally to urge said friction shoes toward said casing.

14. A variable speed mechanism including an inner drum portion, bearing means supporting said inner drum portion, friction clutch means within said inner drum portion, an outer rim portion spaced from said inner drum portion, air deflecting fins connecting said inner drum portion and said outer rim portion to deflect air through said pulley between said inner drum portion and said outer rim portion, and a series of heat dissipating fins on said inner drum portion interposed between said air deflecting fins.

EDWIN M. FERGUSON.
ALBERT W. BARTON.